United States Patent [19]

Signaigo et al.

[11] Patent Number: 5,270,699
[45] Date of Patent: Dec. 14, 1993

[54] FAULT TOLERANT SIGNALING

[75] Inventors: Robert C. Signaigo, Oak Lawn; Joseph C. Steinlicht, Glen Ellyn, both of Ill.

[73] Assignee: Rockwell International Corporation, Seal Beach, Calif.

[21] Appl. No.: 744,209

[22] Filed: Aug. 13, 1991

[51] Int. Cl.⁵ .............................................. H04Q 1/00
[52] U.S. Cl. ........................... 340/825.01; 340/825.16; 379/266
[58] Field of Search ...................... 340/825.01, 825.16, 340/507, 825.3; 371/12, 14, 36, 20.1, 9.1; 379/265, 266, 309, 104, 105; 364/184, 187; 307/464

[56] References Cited

U.S. PATENT DOCUMENTS

| | | |
|---|---|---|
| 4,048,452 | 9/1977 | Oehring et al. .................... 379/266 |
| 4,562,575 | 12/1985 | Townsend ............................ 371/9.1 |
| 5,136,498 | 8/1992 | McLaughlin et al. ............. 364/184 |

Primary Examiner—Donald J. Yusko
Assistant Examiner—Edwin C. Holloway, III
Attorney, Agent, or Firm—C. B. Patti; V. L. Sewell; H. F. Hamann

[57] ABSTRACT

An automatic call distributor (10) with a multichannel communication bus, a plurality of bus maintenance units (13, 15), and at least one status and control circuit (11) for preventing erroneous resetting of a bus maintenance unit (13) by a status and control circuit (11).

13 Claims, 4 Drawing Sheets

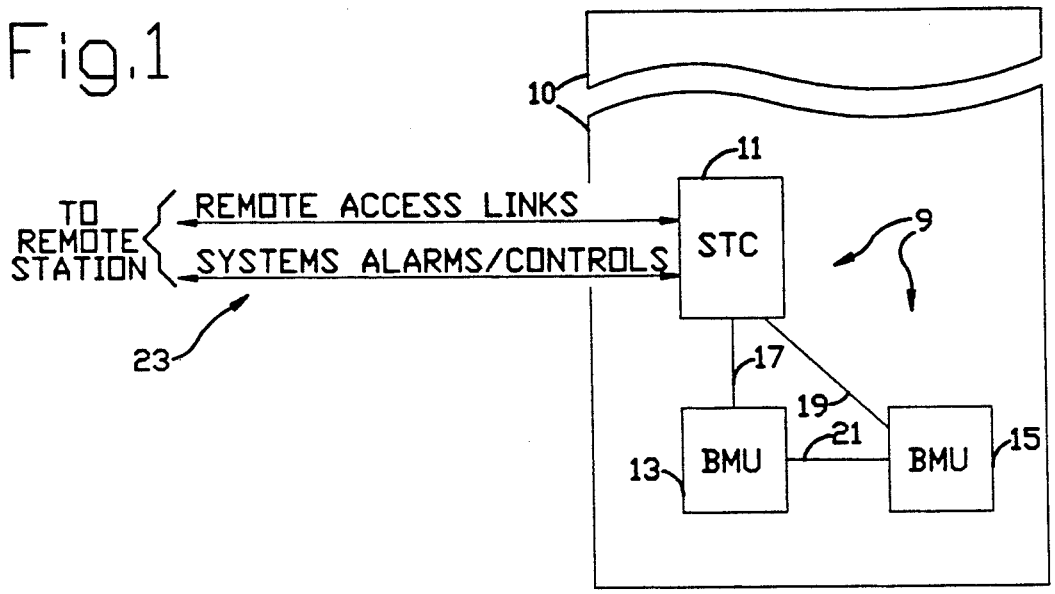
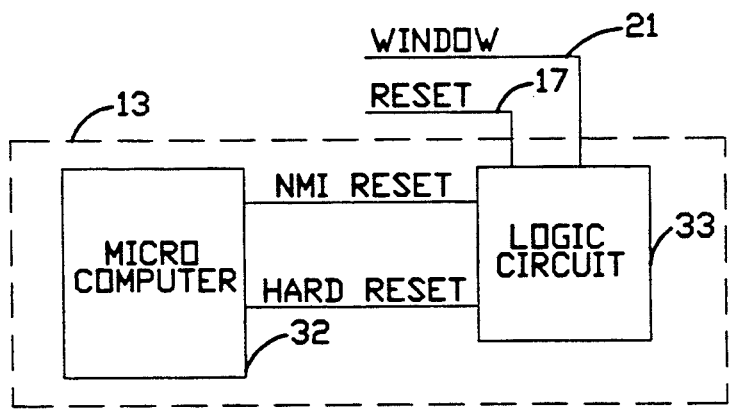

Fig.2

STEP 1
STC 11 DETERMINES THAT BMU 13 NEEDS TO BE RESET.

STEP 2
STC 11 REQUESTS BMU 15, VIA LINK 19, TO ASSERT A WINDOW TO BMU 13.

STEP 3
IF BMU 15 CONCURS WITH STC 11 THAT BMU 13 NEEDS TO BE RESET, BMU 15 ASSERTS A WINDOW SIGNAL TO BMU 13.

STEP 4
BMU 15, VIA LINK 19, INFORMS STC 11 OF ITS ACTION.

STEP 5
STC 11 ISSUES THE RESET SIGNAL TO BMU 13.

STEP 6
BMU 13 DETECTS THE ASSERTION OF THE WINDOW AND RESET SIGNALS; IF BOTH SIGNALS MEET APPROPRIATE TIMING REQUIREMENTS, BMU 13 WILL RESET.

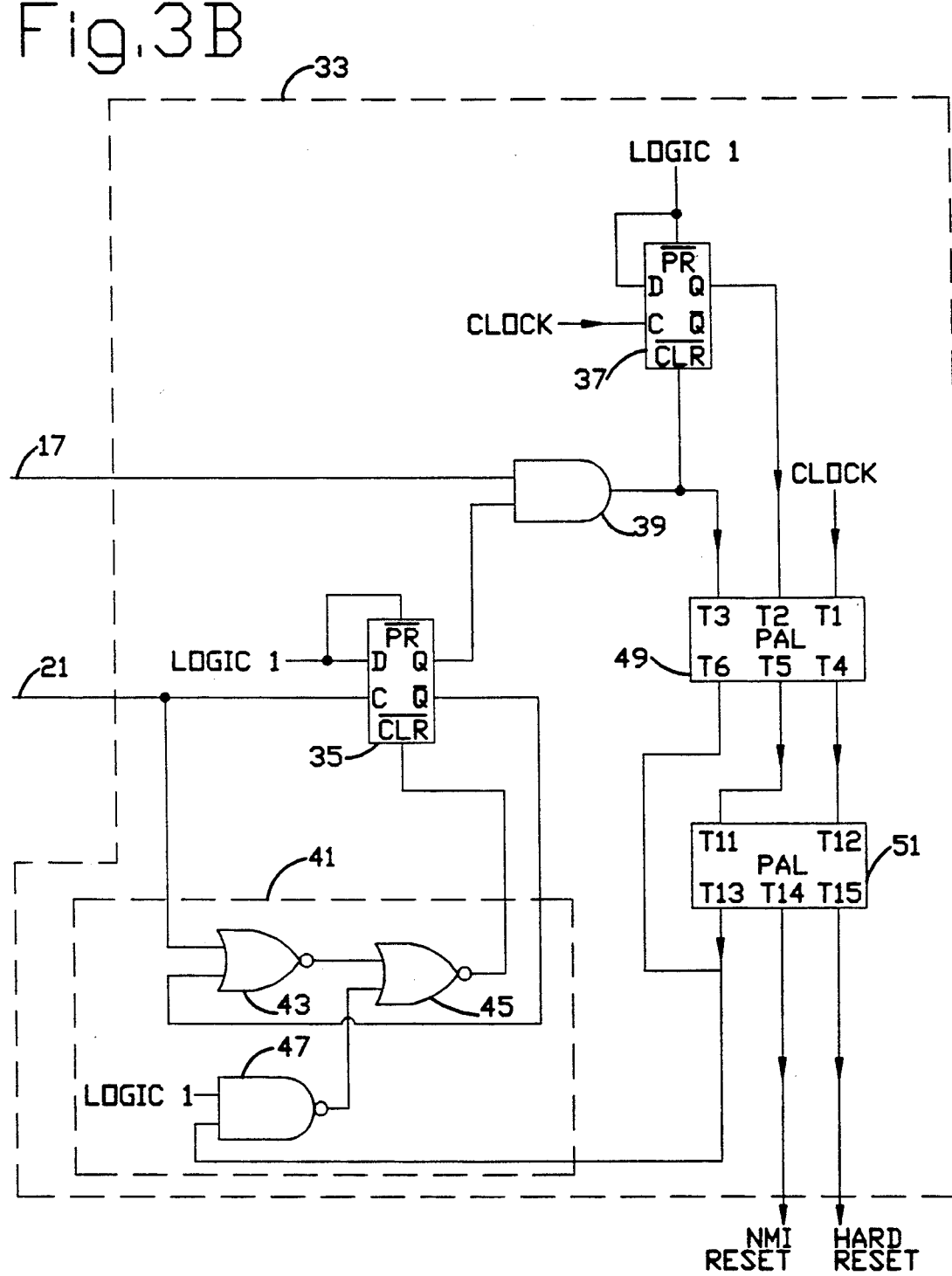

FAULT TOLERANT SIGNALING

BACKGROUND OF THE INVENTION

1. Field of the Invention

This invention relates to fault tolerant signaling and, in its presently preferred application, to fault tolerant resetting within an ACD.

2. Description of the Related Art

As is well known in the art, an automatic call distributor (ACD) is commonly used to aid a business or the like that must answer a heavy volume of incoming telephone calls. An ACD, usually on the business premises, answers the inbound calls and accomplishes one or more of the following: routes and prioritizes incoming calls; causes callers to wait till answered; provides management with data; aids in automating call answering and/or recording.

An ACD is often very sophisticated and complex in nature and thus is subject to failures in hardware and/or software. Since reducing ACD malfunctions and/or down-time is important to the ACD user, an ACD often includes a capability of reporting status, faults, etc. to a remote maintenance station where an operator/monitor can interpret the reports and send appropriate instructions/signals back to the ACD so that it will effect certain corrections and/or cures. For example, an ACD element X might report to the maintenance operator a problem with ACD element Y, whereupon the operator signals/instructs X to effect or command corrective action for Y.

Additionally, the ACD is often sophisticated and powerful enough to contain self-monitoring and self-correction schemes. That is, an ACD element X might monitor some parameter of ACD element Y, and if X is not satisfied with Y, X could provide Y a command/signal to effect corrective or curative action.

In some instances, however, a particular corrective or curative action can itself create sufficient annoyance in processing that it is desirable to have a high degree of confidence, that the action is really needed, before the corrective action is taken.

For example, since a fault in element X might erroneously command corrective action for element Y, X is often not designed or permitted to effect certain corrective actions for Y which the user finds overly annoying and/or disruptive. Instead, in order to achieve the level of confidence desired, manual intervention is often involved. That is, a maintenance person comes to the ACD site and tests and determines whether or not Y actually needs assistance.

In accordance with the present invention, there is featured the provision of method and apparatus whereby a signaled device reacts to "authorized" signals or messages but ignores spurious, unauthorized, erroneous, or unintentional messages/signals. A fault-tolerant quality is provided, namely: a device continues to operate properly despite some fault that evokes an unauthorized message to do otherwise. In the context of ACDs, self-curing and/or remote-curing may be achieved with the desired confidence level, thereby obviating the use of manual intervention. In the preferred application, there is employed a concurrency scheme whereby two autonomous entities must agree upon a reset action, that is desired by one of the two entities, before that action is effected by a reset targeted entity. The invention prevents resets from being falsely triggered by a single-point failure, or by the insertion or removal of any single card.

SUMMARY OF THE INVENTION

It is therefore the principal object of the present invention to provide an automatic call distributor with a fault tolerant, bus maintenance unit resetting apparatus.

This object is achieved in part by providing an automatic call distributor having a multichannel bus for providing communication between a plurality of internal telephonic units of the distributor and a plurality of external telephonic units of an external telephonic network, a plurality of bus maintenance units for successively, individually, selectively controlling the communication on the multichannel bus with a fault tolerant bus maintenance unit resetting apparatus, comprising means for monitoring the activated one of the plurality of bus maintenance units for faults, means associated with at least one of the plurality of bus maintenance units for performing sanity checks on other ones of the plurality of bus maintenance units and a control circuit responsive to both the monitoring means and the sanity checks performing means for resetting an active one of the plurality of bus maintenance units in the event of detection of a fault only if the active bus maintenance unit also fails to pass a sanity check.

Also, the object of the invention is obtained by provision of an automatic call distributor having a multichannel communication bus, a plurality of resettable bus maintenance units for individually, successively, selectively controlling communication on the multichannel communication bus, and a status and control circuit for monitoring and controlling resetting of a bus maintenance unit, with a fault tolerant system for preventing erroneous resetting of a bus maintenance unit comprising means for designating one of the plurality of bus maintenance units as a controlling bus maintenance unit and the others of the plurality of bus maintenance units as noncontrolling bus maintenance units, means associated with the status and control circuit for diagnosing the controlling bus maintenance unit, including means for actuating along a first path a noncontrolling bus maintenance unit to aid in effecting resetting of the controlling bus maintenance unit, means for issuing along a second path a reset signal to reset the controlling bus maintenance unit and means for establishing a first predetermined condition. The fault tolerance system also has means associated with the noncontrolling bus maintenance unit responsive to said actuating means for issuing to the controlling bus maintenance unit along a third path, an enable signal allowing the controlling bus maintenance unit to be reset by the status and control circuit if the first predetermined condition is established.

Also, the object of the invention is obtained by providing an automatic call distributor having a multichannel communication bus and a resettable bus maintenance unit for controlling communication on the multichannel communication bus, with a fault tolerant system for preventing erroneous resetting of the bus maintenance unit via a first path comprising a sanity checker, a status and control circuit including means for diagnosing the bus maintenance unit, means for actuating the sanity checker and means for resetting the bus maintenance unit. The fault tolerant system also has means associated with the status and control circuit for actuating the sanity checker via a second path in response to the diagnosing means, means associated with the sanity checker for performing upon actuation a sanity check on the bus maintenance unit via a third path, means associated with the sanity checker for sending an enable signal to the bus maintenance unit via the third path, means associated with the sanity checker for sending an informing signal to the status and control circuit via the second path, means associated with the status and control circuit for resetting the bus maintenance unit via the first path if the sanity checker sends the informing signal to the status and control unit and the status and control circuit diagnoses the bus maintenance unit as needing resetting, means associated with the bus maintenance unit for establishing at least one time window for receiving the enable signal and the resetting signal and means associated with the bus maintenance unit for resetting itself if the enable signal and the resetting signal are received by the bus maintenance unit within the at least one time window.

BRIEF DESCRIPTION OF THE DRAWINGS

These and other features, objects, and advantages of the invention will become more apparent upon reference to the following specification, claims, and appended drawings, in which:

FIG. 1 is a block diagram schematic representing one presently preferred inventive embodiment;

FIG. 2 is a flow chart of steps executed by microcomputer and logic elements in the FIG. 1 embodiment;

FIG. 3a is a block diagram schematic showing item 13 of FIG. 1 in greater detail;

FIG. 3b is a schematic showing item 33 of FIG. 3a in greater detail; and

DESCRIPTION OF THE PREFERRED EMBODIMENT

Figure 4:
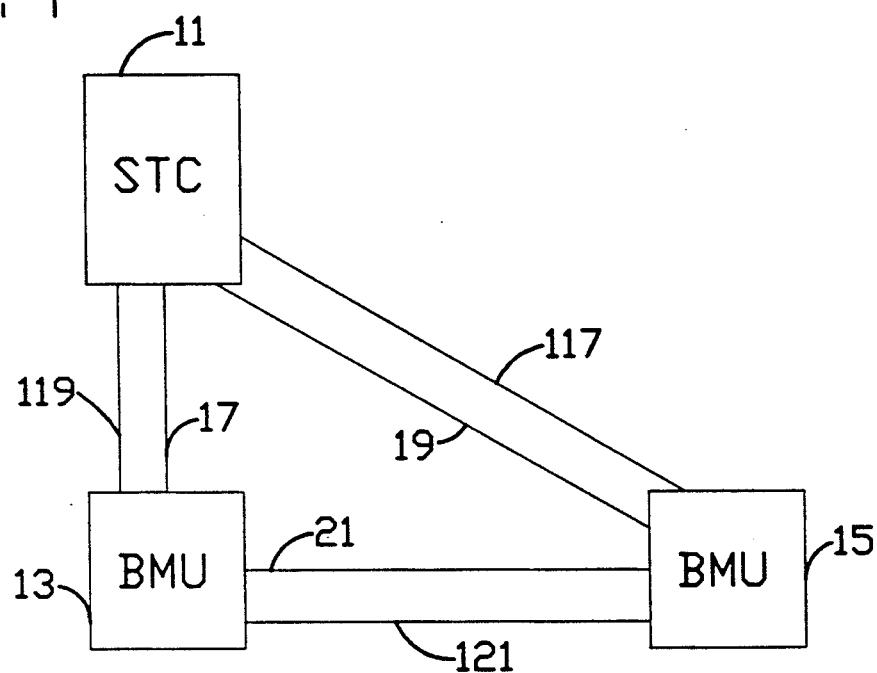
FIGS. 4 and 5 are block diagram schematics representing alternative embodiments employing the principles of the invention.

Turning now to FIG. 1, therein is represented a portion 9 of a control subsystem of an ACD 10. Typically, ACD 10 is a Rockwell International Model G3000E. Typical functions of the control subsystem include high level call processing and report generation. The part of the subsystem identified in FIG. 1 as STC 11 is a status and control unit that serves as a remote maintenance coordinator, as an interface with the outside world, and as a diagnostician. Alarm and monitor points within the control subsystem come in to STC 11 so that it may collect and report various faults.

The part of the subsystem identified in FIG. 1 as BMU 13 is a bus management unit that serves as decision maker/bus arbitrator and as maintenance controller. Alternate BMU 15 is a copy of BMU 13 and accomplishes redundancy. The duplex BMU's decide between themselves which is going to act as the active device, and there is an active/hot-standby relationship between the two BMU's.

Link 21 provides communication between the two BMU's so that there is maintained consistent system status of the backup copy BMU to minimize losses during fault conditions requiring a switchover. Links 17 and 19 are for maintenance activity and alarm indications. Links 23 serve as communication lines to a remote station and carry alarms, controls, and/or commands. STC 11, as presently embodied, comprises a micro computer comprising a 68000 microprocessor with approximately 2 megabytes of memory. BMU 13, as presently embodied, comprises a micro computer comprising a 68020 microprocessor and approximately 4 megabytes of memory. BMU 13 also includes a logic/decision circuit about which more will be said later herein.

The presently preferred application of the invention resides within the context illustrated in FIG. 1. More specifically, should the status and control unit 11 desire, based on either a remote or local/internal decision, to signal BMU 13 to effect a corrective action, STC 11 must first request the aid of alternate BMU 15 via a request passed on the link 19. Should the alternate BMU 15 concur with the request, it will signal its authorization/approval via link 21 to the targeted BMU 13. With this indication of concurrence received, the targeted BMU 13 will honor corrective action signaling from the STC 11, provided same meets appropriate and/or predetermined parameters.

Typically, the type of corrective action, that STC 11 would decide is needed at BMU 13, would be a reset, and STC 11 would also decide whether same should be a hard reset or a soft/NMI reset. Also, after STC 11 requests and obtains the aid/concurrence of alternate BMU 15, the indication of concurrence issued to target BMU 13 by alternate BMU 15 is preferably in the form of a window signal. With this window signal asserted, STC 11 will typically issue to BMU 13 a short duration signal if an NMI reset is desired, or a long duration signal if a hard reset is desired, and BMU 13 will honor the received command provided the duration is within certain tolerances or parameters.

Thus, STC 11 has the ability to reset BMU 13 and, simultaneously, the concurrence scheme accomplishes a single point fault tolerance so that an improperly functioning STC 11 or an improperly functioning BMU 15 will not induce an unauthorized reset of BMU 13.

Changing any single card in either STC 11 or BMU 15, will cause no adverse effects since only the reset or window signals, not both, can be glitched. The proper action of both signals is needed in order for a request to be acted upon. Any single card failing also cannot result in erroneous action being taken since only the reset or window signal can be affected, not both.

Turning now to FIG. 2, therein is represented the method accomplished by the apparatus of FIG. 1. The computer portions of STC 11 and BMU 15 are programmed in "C" language to accomplish steps 1 through 5. Step 6 is accomplished with a logic circuit which will be additionally addressed hereinbelow.

More particularly now:

Step 1: STC 11 decides, for whatever reason, that BMU 13 needs to be reset. The computer portion of STC 11 is programmed to make such decision.

Step 2: STC 11 requests BMU 15 to open a window to BMU 13. This is accomplished by the programmed computer portion of STC 11 sending a message over link 19 to BMU 15.

Step 3: If BMU 15 concurs with STC 11 that BMU 13 needs to be reset, BMU 15 asserts a window signal to BMU 13. The computer portion of BMU 15 is programmed to make this decision and take such action. If BMU 15 concurs, it writes a register and a window signal to BMU 13 is asserted.

Step 4: BMU 15 informs STC 11, via link 19, of the action taken by BMU 15. This is accomplished by the programmed computer portion of BMU 15 sending a message to STC 11 over the link 19.

Step 5: STC 11 issues the reset signal to BMU 13. In the preferred embodiment, the programmed computer portion of STC 11 writes a register and a reset signal to BMU 11 is asserted.

Step 6: BMU 13 detects the assertion of window and reset signals and if the two signals overlap for a first predetermined duration, the computer portion of BMU 13 will receive an NMI reset, and if the two signals overlap for a second, usually longer, predetermined duration, the computer portion of BMU 13 will receive a hard reset.

As used herein, NMI reset means a non-maskable interrupt (i.e., a soft reset) and a hard reset means a complete board level reset.

The logic circuitry 33 for accomplishing step 6 is represented in block diagram form in the FIG. 3a representation of BMU 13, and circuit 33 is shown in FIG. 3b in greater detail. Referring to FIG. 3b, items 35 and 37 are D-type flipflops, item 39 is an AND gate, circuit 41 comprises NOR gates 43 and 45 and a NAND gate 47. Items 49 and 51 are PAL (programmable array logic) chips type 22V10. PALs 49 and 51 are individually programmed to accomplish specific and different functions as indicated below.

The window signal on link 21 is connected to the clock input of D-type flipflop 35 and to an input of circuit 41 which serves to guard against an "indefinitely-open" window signal. D-type flipflop 35 serves as as a window signal edge detector, and output from its Q terminal is input to gate 39 along with the reset signal on link 17. Thus the reset and window signals are AND'ed by gate 39. The AND gate 39 output is connected to the $\overline{CLR}$ input of D flipflop 37 and to an input, designated as T3, of PAL 49. The Q output of D flipflop 37 is connected to an input, designated as T2, of PAL 49. Flipflop 37 is a continuity checker and verifies that the reset and window signals remain asserted. PAL 49 is programmed to accomplish a checking of the duration of overlap of the reset and window signals. If the overlap continues for about a 50 msec duration, the output designated as T4 becomes a logic 1. If the overlap continues on for a total of about 100 msec, the T5 output also becomes a logic 1. If the overlap is not continuous, as determined by D flipflop 37, the Q output of D flipflop 37 will reset the duration check performed by PAL 49.

Inputs, designated as T11 and T12, of PAL 51 look at outputs T4 and T5 and determine if an NMI reset or a hard reset should be issued. If at a predetermined checkpoint in time, only output T4 is a logic 1, PAL 51 will issue an NMI reset at output T14. If at the predetermined checkpoint in time, both T4 and T5 are logic 1, then PAL 51 will issue a hard reset at output T15.

Also, upon issuing either an NMI or hard reset, PAL 51 issues a signal both to T6 of PAL 49 and to an input of circuit 41. Such signal serves to clear PAL 49 and also to clear D flipflop 35. In clearing the D flipflop 35, all other reset signals are prevented from having any effect until the window signal is closed and reasserted. That is, during the assertion of a window signal, only one reset action will be recognized. Should additional reset actions be desired, the window and reset signals must be rescinded and reasserted in the proper order. This prevents software from opening a window and leaving it open indefinitely. The NMI reset signal will effect an NMI reset of the computer portion of BMU 13. The hard reset signal will effect a hard reset of the computer portion of BMU 13.

Concurrence by BMU 15, in the preferred embodiment, is based on sanity checks, conducted by BMU 15, of both STC 11 and BMU 13. That is, BMU 15 checks "keep alive" messages that regularly pass between STC 11 and BMU 15 and also checks "keep alive" messages that regularly pass between BMU 13 and BMU 15. These messages periodically report "I'm o.k." if the reporting item is sound. Thus, BMU 15 checks to see if STC 11 and BMU 13 have timely supplied such reports, and if STC 11 checks out sane, but BMU 13 does not, BMU 15 will concur in the request from STC 11.

Other degrees and/or schemes of concurrence could be considered for use. For example, a simplified concurrence might merely comprise a "yes sir!-No questions asked"/rubber stamp (i.e., strict obeyance) type of concurrence. A more complex concurrence might comprise a duplicate/redundant decision-making capability.

One variation on the above theme is represented in FIG. 4. More particularly, the FIG. 4 apparatus has the capability of the FIG. 1 apparatus but in addition, BMU 15 may be the reset targeted BMU while BMU 13 serves as the concurring/aiding BMU. A link 117, analogous to link 17 between STC 11 and BMU 13, is accomplished between STC 11 and BMU 15. A link 119, analogous to link 19 between STC 11 and BMU 15, is accomplished between STC 11 and BMU 13. BMU 15 includes a copy of the logic circuitry shown in FIGS. 3a and 3b. STC 11 may initiate a reset of either one of the BMUs and request the non-targeted BMU for concurrence and to open a window of opportunity to the targeted BMU. Thus, the STC and "healthy" BMU must interact to effect a reset type recovery of the BMU suspected to be faulty.

Figure 5:
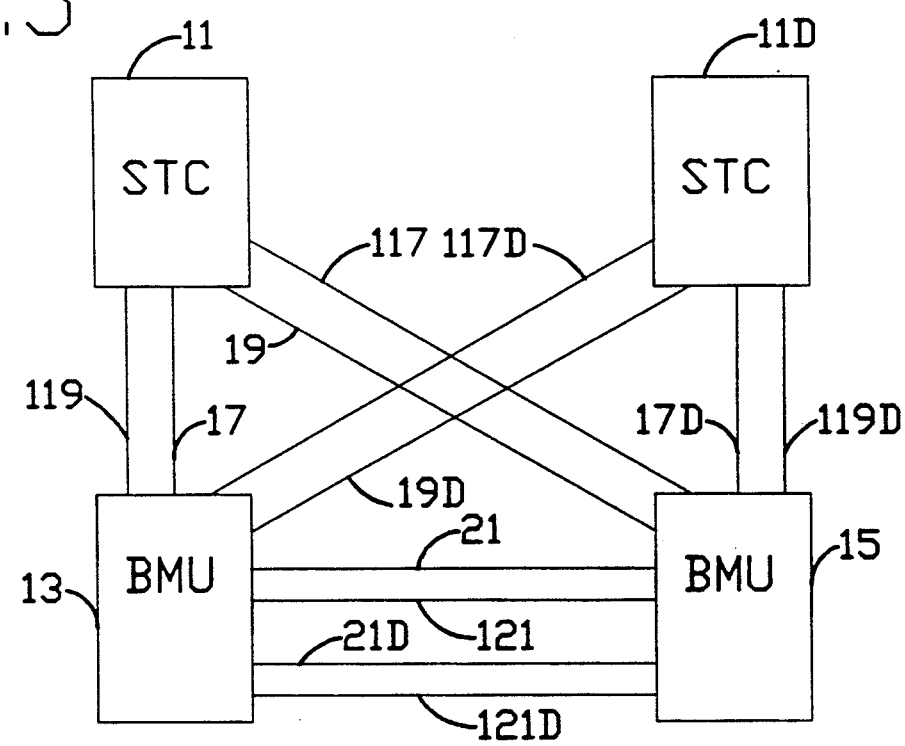

Another preferred embodiment is represented in FIG. 5. Therein is shown a duplex embodiment wherein the STC function is also implemented with redundancy. That is, STC 11d is a copy of STC 11 in both form and function. Thus, the FIG. 5 apparatus has the capability of the FIG. 4 apparatus but in addition, STC 11d may initiate the reset request of either BMU and and request the concurrence/aid of the non-targeted BMU. Additional links around the STC 11d/BMU/BMU triangle are accomplished so as to duplicate the links around the STC 11/BMU/BMU triangle.

In one variation on the FIG. 5 apparatus, further capability may be added in that a BMU may be permitted to initiate a reset action of an STC. In such instance, the decision-making BMU requests concurrence/aid of the non-targeted STC and also issues a reset to the targeted STC which is suspected to be faulty. Either of the BMUs may be the decision maker (as to whether an STC needs resetting) and either STC may be the target, while the other, non-targeted STC serves to provide the concurrence/aid and to assert the window of opportunity to the targeted STC. Sufficient links are accomplished, and logic circuits included, to effect this capability.

Returning briefly to FIGS. 1, 2, and 3 to highlight other variations, it should be noted that the therein disclosed time concurrence principle is not the only type of concurrence or agreement that could be employed. For example, in the FIG. 1 apparatus, alternate BMU 15 could be implemented so as to issue an enablement or approval code, such as a predetermined digital word, to BMU 13, whereupon a circuit in BMU 13 could be unlocked and/or readied to receive a reset pulse, or a special reset digital word, from STC 11.

In another variation, Step 4, or a step comparable thereto, in FIG. 2 may be deleted. In such embodiments, it can be useful to make the Step 2 request signal and the Step 5 reset signal sufficiently different from one another so that a glitch in STC 11 is unlikely to send both signals.

Also, the step identified as step 5 could occur earlier than shown in FIG. 2. Merely as examples, it could occur between the steps identified as 1 and 2, or between 2 and 3, or simultaneously with 2 or 3.

Thus, while various embodiments of the present invention have been shown and/or described, it is apparent that changes and modifications may be made therein without departing from the invention in its broader aspects. The aim of the appended claims, therefore, is to cover all such changes and modifications as fall within the true spirit and scope of the invention.

What is claimed is:

1. In an automatic call distributor having a multichannel bus for providing communication between a plurality of internal telephonic units of the distributor and a plurality of external telephonic units of an external telephonic network, a plurality of bus maintenance units for successive activation to individually, selectively control the communication on the multichannel bus, the improvement being a fault tolerant bus maintenance unit resetting apparatus, comprising:
    means for monitoring the activated one of the plurality of bus maintenance units for faults;
    means associated with at least one of the plurality of bus maintenance units for performing sanity checks on other ones of the plurality of bus maintenance units; and
    a control circuit responsive to both the monitoring means and the sanity checks performing means for resetting an active one of the plurality of bus maintenance units in the event of detection of a fault only if the active bus maintenance unit also fails to pass a sanity check.

2. The automatic call distributor of claim 1 in which the control circuit includes means to actuate, via a first path, one of the plurality of bus maintenance units to perform the sanity check on the activated bus maintenance unit in response to detection of a fault by the monitoring means, and
    the actuated bus maintenance unit causes its associated sanity checks performing means to perform the sanity checks on the activated bus maintenance unit via a second path different from said first path.

3. The automatic call distributor of claim 2 in which the control circuit includes means to reset the controlling bus maintenance unit via a third path different from both the first and second paths.

4. The automatic call distributor of claim 1 including another monitoring means and another control circuit for successively, individually, selectively monitoring and controlling resetting of the plurality of bus maintenance units in cooperation with the monitoring means and the control unit.

5. In an automatic call distributor having a multichannel communication bus, a plurality of resettable bus maintenance units for individually, successively, selectively controlling communication on the multichannel communication bus, and a status and control circuit for monitoring and controlling resetting of a bus maintenance unit, the improvement being a fault tolerant system for preventing erroneous resetting of a bus maintenance unit, comprising:
    means for designating one of the plurality of bus maintenance units as a controlling bus maintenance unit and the others of the plurality of bus maintenance units as noncontrolling bus maintenance units;
    means associated with the status and control circuit for diagnosing the controlling bus maintenance unit, including
        means for actuating along a first path a noncontrolling bus maintenance unit to aid in effecting resetting of the controlling bus maintenance unit, and
        means for issuing along a second path a reset signal to reset the controlling bus maintenance unit;
    means for establishing a first predetermined condition; and
    means associated with the noncontrolling bus maintenance unit responsive to said actuating means for issuing to the controlling bus maintenance unit along a third path, an enable signal allowing the controlling bus maintenance unit to be reset by the status and control circuit if the first predetermined condition is established.

6. The automatic call distributor of claim 5 which includes
    means for establishing a second predetermined condition, and
    means associated with the controlling bus maintenance unit and responsive to receiving both the reset signal from the status and control circuit and the enable signal from the noncontrolling bus maintenance unit to reset the controlling bus maintenace unit, if the second predetermined condition is established.

7. The automatic distributor of claim 5 in which the noncontrolling bus maintenance unit has means for signaling to the status and control circuit that the noncontrolling bus maintenance unit has issued the enable signal to the controlling bus maintenance unit.

8. The automatic call distributor of claim 7 in which the enable signal issued by the noncontrolling bus maintenance unit is a window signal.

9. The automatic call distributor of claim 8 in which the second predetermined condition is established when the window signal, and the reset signal overlap for a predetermined period of time.

10. The automatic call distributor of claim 9 in which the reset signal is a hard reset associated with a first duration of the period of overlapping and a soft reset associated with a second duration of the period of overlapping.

11. The automatic call distributor of claim 10 in which the first predetermined condition is the controlling bus maintenance unit failing to pass a sanity check.

12. The automatic call distributor of claim 5 in which the noncontrolling bus maintenance unit includes means to perform a sanity check on the controlling bus maintenance unit.

13. In an automatic call distributor having a multichannel communication bus and a resettable bus maintenance unit for controlling communication on the multichannel communication bus, the improvement being a fault tolerant system for preventing erroneous resetting of the bus maintenance unit, comprising:
    a sanity checker;
    a status and control circuit including
        means for diagnosing the bus maintenance unit via a first path,
        means for actuating the sanity checker, and
        means for resetting the bus maintenance unit;
        means associated with the status and control circuit for actuating the sanity checker via a second path in response to the diagnosing means;

means associated with the sanity checker for performing, upon actuation, a sanity check on the bus maintenance unit via a third path;

means associated with the sanity checker for sending an enable signal to the bus maintenance unit via the third path;

means associated with the sanity checker for sending an informing signal to the status and control circuit via the second path;

means associated with the status and control circuit for resetting the bus maintenance unit via the first path if the sanity checker sends the informing signal to the status and control unit and the status and control circuit diagnoses the bus maintenance unit as needing resetting;

means associated with bus maintenance unit for establishing at least one time window for receiving the enable signal and the resetting signal; and means associated with the bus maintenance unit for resetting itself if the enable signal and the resetting signal are received by the bus maintenance unit within the at least one time window.

* * * * *